(12) United States Patent
Mauerman et al.

(10) Patent No.: US 10,035,391 B2
(45) Date of Patent: Jul. 31, 2018

(54) RECESSED CLAMPING BOLT ATTACHMENT SYSTEM FOR SWAY CONTROL HITCH BRACKET

(76) Inventors: Kenneth David Mauerman, Orem, UT (US); James Robert Stratton, Springville, UT (US)

(*) Notice: Subject to any disclaimer, the term of this patent is extended or adjusted under 35 U.S.C. 154(b) by 0 days.

(21) Appl. No.: 13/540,593

(22) Filed: Jul. 2, 2012

(65) Prior Publication Data

US 2013/0056956 A1    Mar. 7, 2013

Related U.S. Application Data

(60) Provisional application No. 61/503,563, filed on Jun. 30, 2011.

(51) Int. Cl.
*B60D 1/24*    (2006.01)

(52) U.S. Cl.
CPC .................. *B60D 1/247* (2013.01)

(58) Field of Classification Search
CPC ............ B60D 1/30; B60D 1/32; B60D 1/325; B60D 1/345
USPC ............ 280/432, 455.1, 474; 411/81, 90, 91
See application file for complete search history.

(56) References Cited

U.S. PATENT DOCUMENTS

| | | | |
|---|---|---|---|
| 399,813 A * | 3/1889 | Allen | 411/81 |
| 3,471,170 A | 10/1969 | Rendessy | |
| 3,801,133 A | 4/1974 | Thompson | |
| 3,957,286 A | 5/1976 | Goodwin | |
| 4,165,885 A | 8/1979 | Good et al. | |
| 4,306,734 A | 12/1981 | Swanson et al. | |
| 4,549,746 A | 10/1985 | Hager | |
| 5,660,409 A | 8/1997 | Hensley | |
| 5,707,071 A | 1/1998 | Prestidge et al. | |
| 7,025,370 B2 | 4/2006 | Anderson et al. | |
| 7,303,205 B2 | 12/2007 | Richardson et al. | |
| 7,967,320 B2 * | 6/2011 | Anderson et al. | 280/455.1 |
| 8,628,107 B2 * | 1/2014 | Harper et al. | 280/515 |
| 2006/0049612 A1 | 3/2006 | Anderson et al. | |
| 2008/0122198 A1 | 5/2008 | Anderson | |
| 2008/0143078 A1 | 6/2008 | McCoy et al. | |
| 2008/0238038 A1 | 10/2008 | Anderson et al. | |
| 2008/0284133 A1 * | 11/2008 | Lair et al. | 280/455.1 |

* cited by examiner

*Primary Examiner* — Jacob D Knutson
*Assistant Examiner* — Felicia L Brittman
(74) *Attorney, Agent, or Firm* — Morriss O'Bryant Compagni Cannon, PLLC

(57) ABSTRACT

A trailer hitch system for equalizing trailer loads and reducing trailer sway. The trailer hitch system may include spring bars that may be attached to a hitch head using a trunnion style connection. The spring bars may be attached to the trailer using rigid brackets that reduce swinging of the spring bars. The rigid brackets having a plurality of contact points may include an upward extending portion for attaching to the trailer tongue, and a lateral extending portion for receiving the spring bars thereupon.

26 Claims, 8 Drawing Sheets

RECESSED CLAMPING BOLT ATTACHMENT SYSTEM FOR SWAY CONTROL HITCH BRACKET

CROSS-REFERENCE TO RELATED APPLICATIONS

This application claims the benefit of U.S. Provisional Application No. 61/503,563, filed Jun. 30, 2011, which is hereby incorporated by reference herein in its entirety, including but not limited to those portions that specifically appear hereinafter, the incorporation by reference being made with the following exception: In the event that any portion of the above-referenced application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to trailer hitch systems, and more particularly, but not necessarily entirely, to a bracket system for trailer hitch systems for reducing trailer sway and/or equalizing the weight of the trailer.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing. An example is illustrated in FIG. 1.

Referring to FIG. 1, a side view is shown of a towing vehicle 10 towing a trailer 12 with a trailer hitch 14. It will be understood that the towing vehicle 10 may be any variety of vehicle known in the art, such as a truck, tractor or car, or any other variety of on-road or off-road vehicle, for example. Likewise, the principles of the present disclosure may be utilized with any variety of trailer 12 known in the art, such as camping trailers, boat trailers or cargo trailers, for example.

As is known in the art, the load from the trailer 12 may force the rear end of the towing vehicle 10 down and raise the front end of the towing vehicle 10 and thereby hitches may drag on the ground. Load equalizing systems, as discussed more fully below, have been used to distribute the load created by the trailer 12 on the towing vehicle 10 to thereby make the trailer 12 and towing vehicle 10 more level.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often exacerbate the sway problem making driving even more stressful and difficult.

Another common problem encountered when towing a trailer is "highway hop," or the bouncing that often happens to trailers on uneven roadways. This problem may be caused by uneven weight distribution. With ordinary ball-type hitches, most of the trailer tongue weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer, and may be joined to the trailer tongue using chains and/or brackets. The end of the spring arms opposite the hitch head may be lifted or loaded to place an upward force on the hitch head to thereby equalize the load exerted on the trailer hitch. Various mechanisms are known for use in association with a trailer hitch to reduce side sway of the trailer as well as to equalize loads. Some prior art embodiments of the brackets for joining the spring bars to the trailer tongue have been formed as rigid members.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
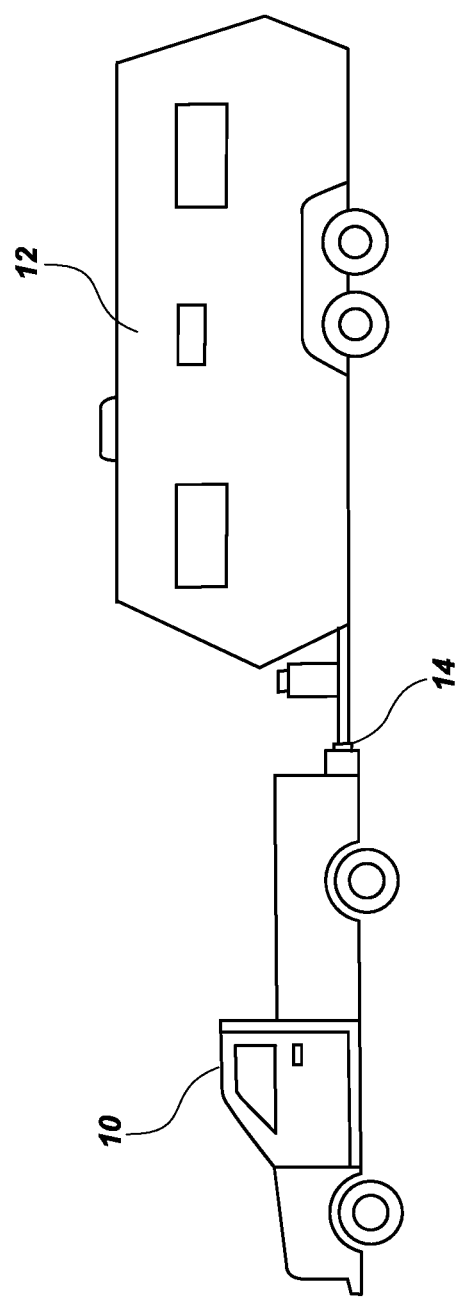
FIG. 1 is a side view of tow vehicle towing a trailer using a prior art trailer hitch.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structures and methods for providing a sway control hitch are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Applicants have discovered a trailer hitching system having a spring bar support member that may be installed onto one or more mounting studs that extend outwardly from an attachment member attached to a frame member of a trailer tongue. The attachment member may be secured to the frame member of the trailer tongue using a clamp-type mounting assembly. The spring bar support member may include a plurality of openings for selectively engaging the free ends of the one or more mounting studs to thereby provide a variable height adjustment feature. The one or more studs may each include a male threaded portion for receiving a threaded nut to thereby secure the spring bar support member to the attachment member.

Figure 2:
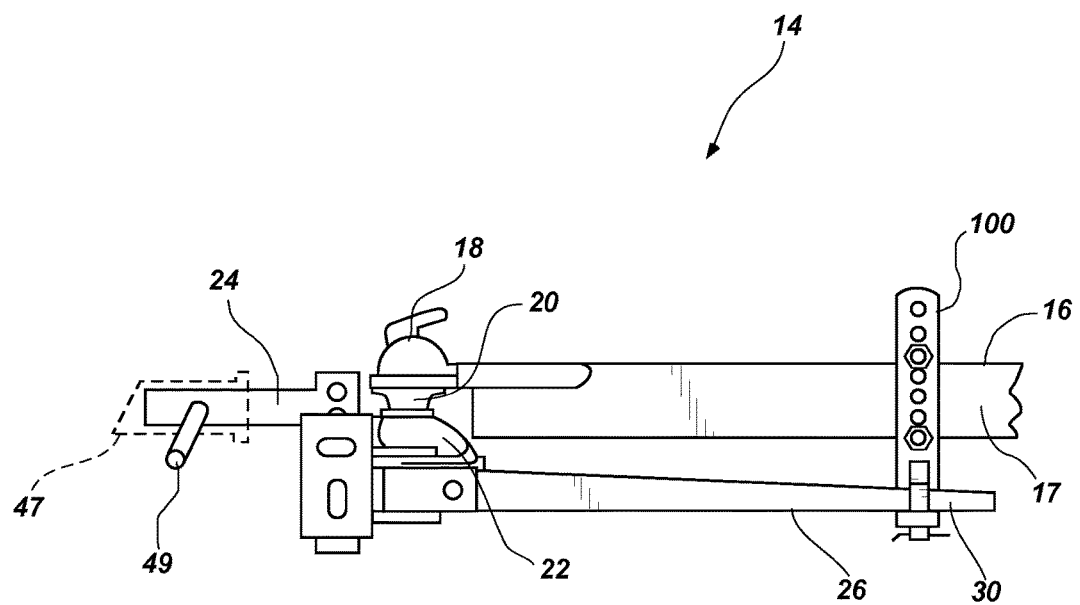
FIG. 2 is a view of a bracket assembly mounted to a frame of a trailer.

FIG. 2 illustrates an embodiment of the present disclosure, which shows an enlarged view of a hitch 14 on a break-away view of a trailer 12, the trailer 12 typically includes a trailer tongue 16 extending at a forward end of the trailer 12. The trailer tongue 16 may comprise a frame member 17. A coupler 18 typically will be located on an end of the tongue 16 for receiving a ball 20 of the hitch 14, in a manner known in the art. The ball 20 typically will be disposed on a hitch head 22 which typically will be attached to the tow vehicle 10 through a connector 24. A spring bar 26 typically will be joined to the hitch head 22 at one end, and to the frame member 17 of the trailer tongue 16 at an opposing end portion using a bracket 28. Typically, two spring bars 26 will be used, one on each side of the trailer tongue 16.

The spring bars 26 may be configured to provide an upward force on the hitch head 22 to equalize the distribution of the load and allow the towing vehicle 10 and trailer 12 to be more level. The spring bars 26 may also be beneficial for reducing sway of the trailer 12.

A sway hitch control bracket assembly 100 may be attached to the frame member 17 of the trailer tongue 16. The assembly 100 may provide support for a terminal end 30 spring bar 26. It will be appreciated that a pair of bracket assemblies 100 may be utilized on the trailer tongue 16.

Figure 3:
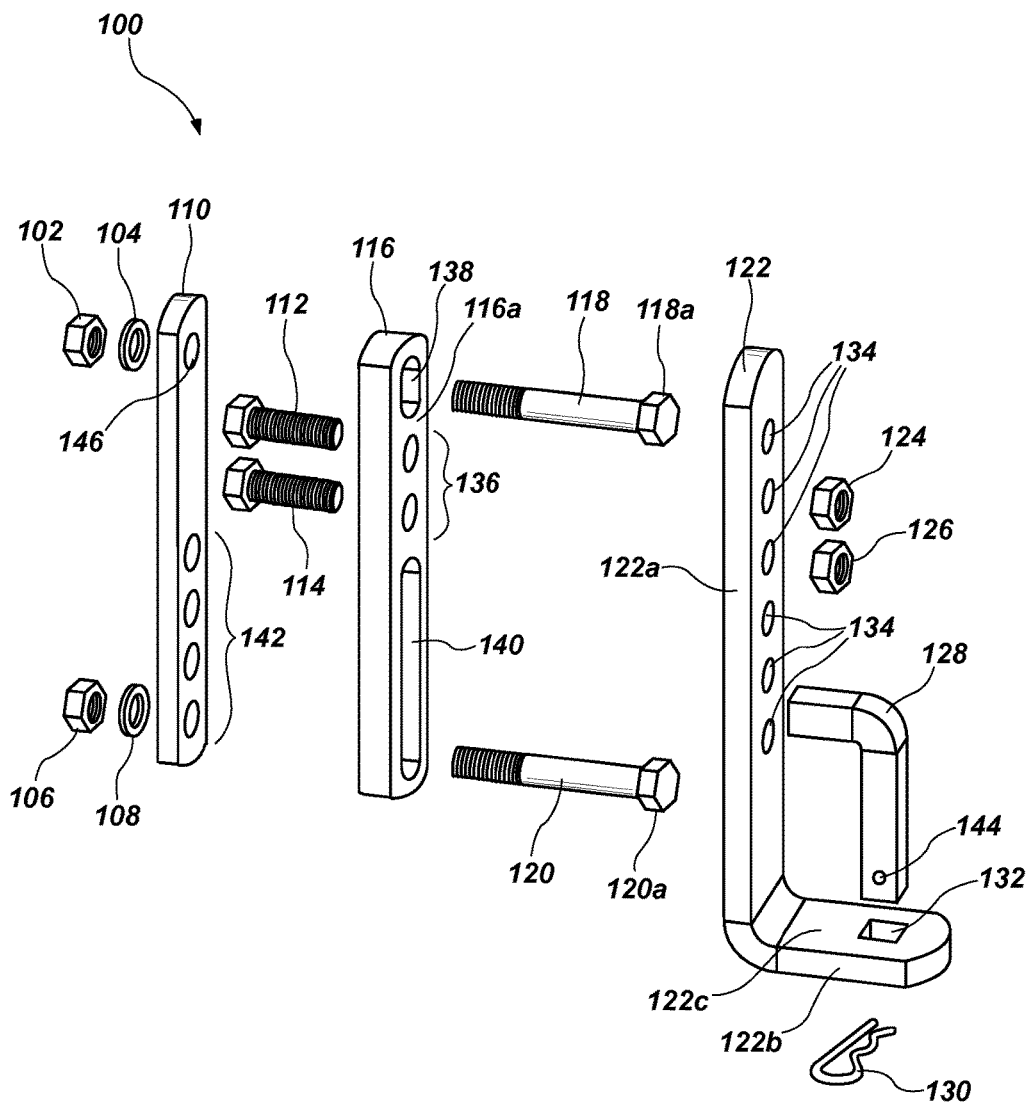
FIG. 3 is an exploded view of a bracket assembly according to an embodiment of the present disclosure.
Figure 4:
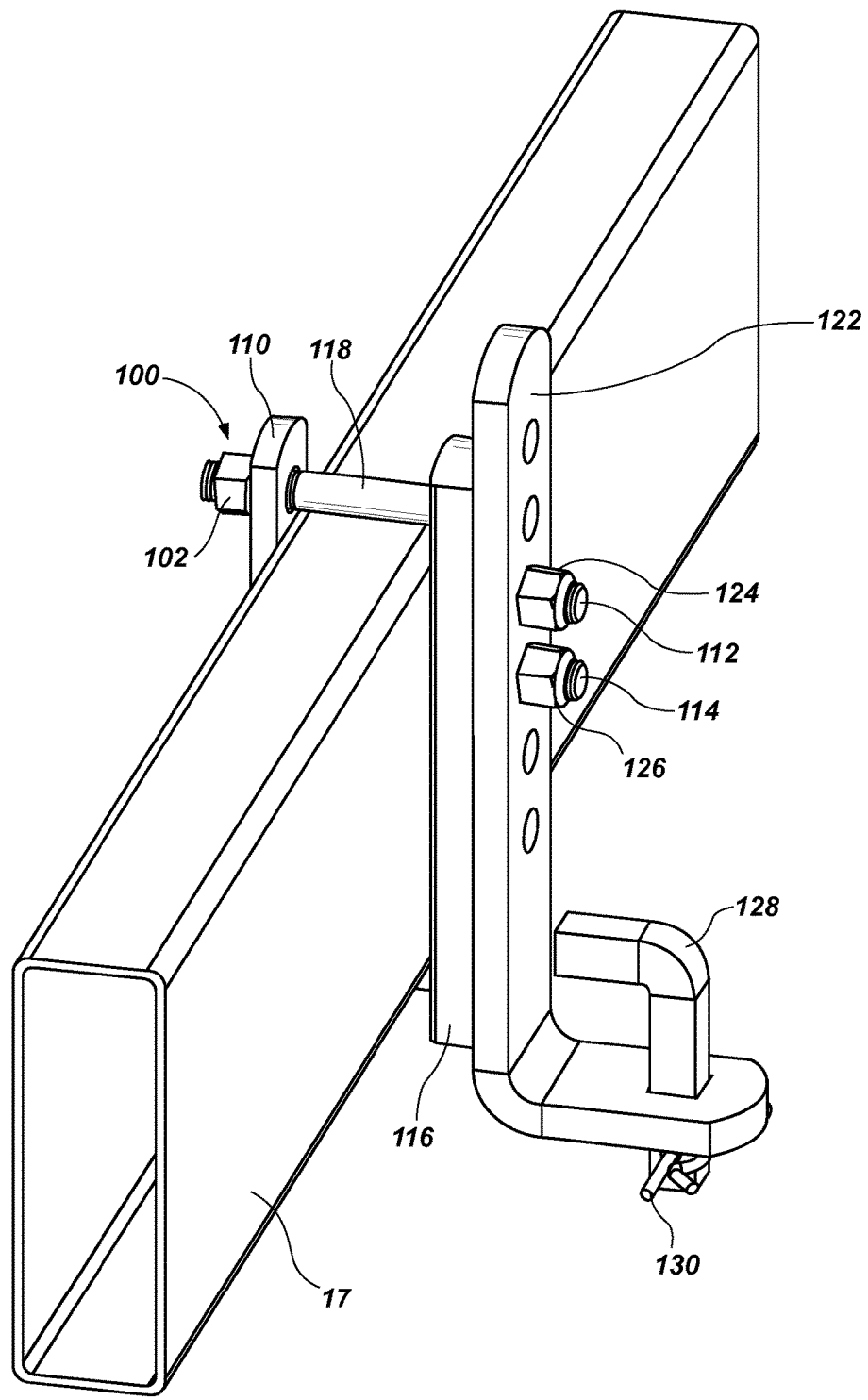
FIG. 4 is a view of a bracket assembly mounted to a frame of a trailer.
Figure 5:
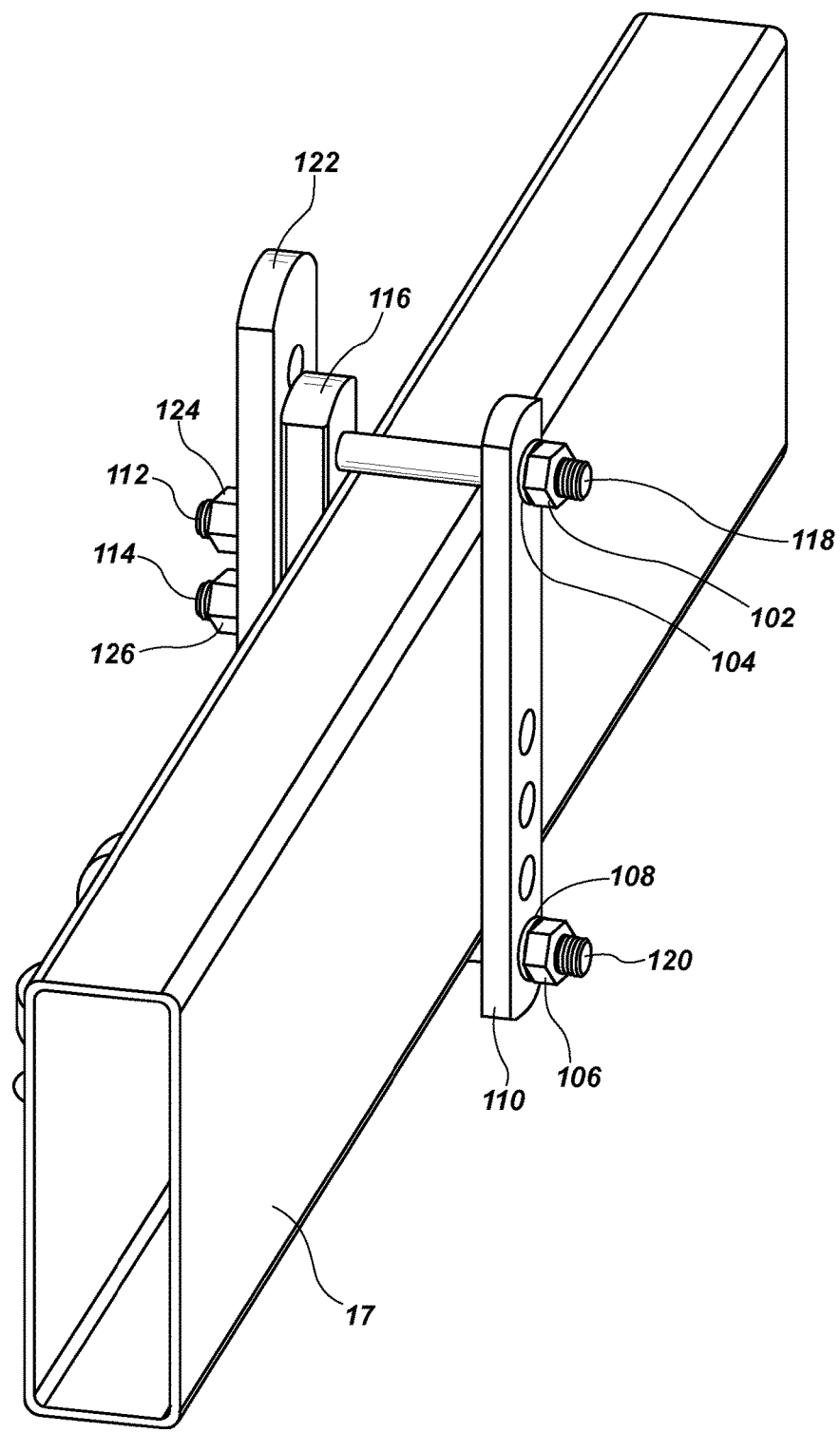
FIG. 5 is a view of a bracket assembly mounted to a frame of a trailer.
Figure 6:
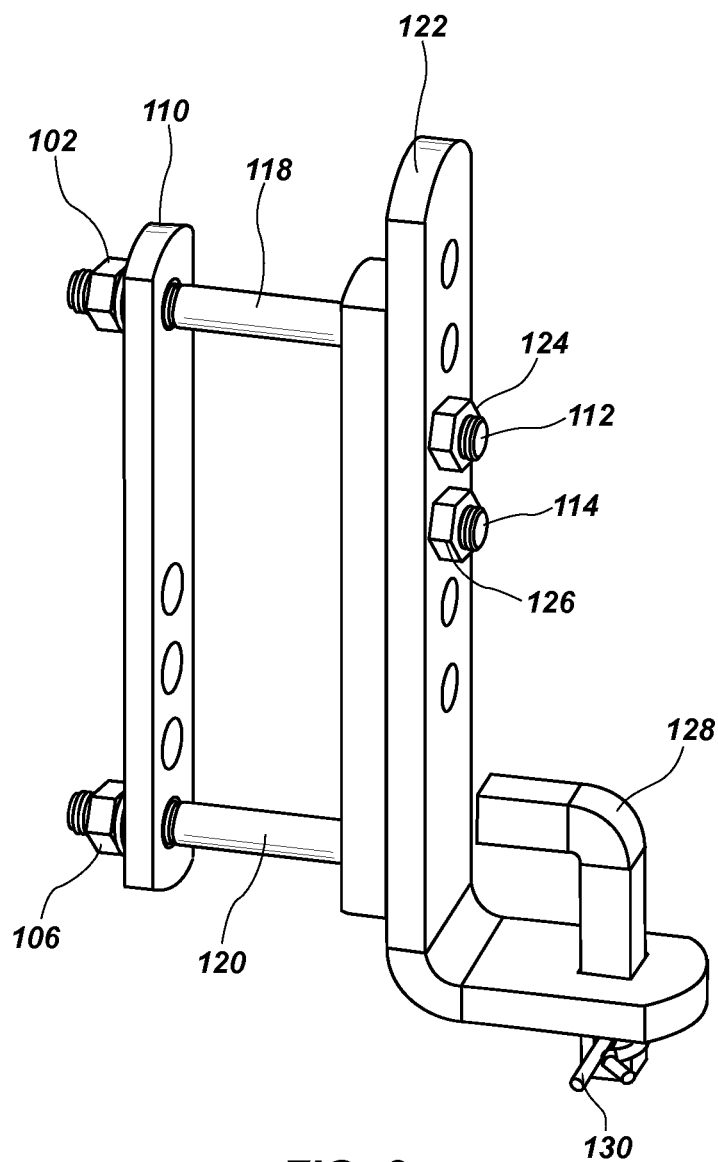
FIG. 6 is a view of a bracket assembly.

Referring now to FIG. 3, there is shown an exploded view of the bracket assembly 100. The assembly 100 may comprise a nut 102 and a lock washer 104 that is installed onto bolt 118. The assembly 100 may comprise a nut 106 and a lock washer 108 that is installed onto bolt 120. The shafts of the bolts 118 and 120 may extend through an inner plate 110 and an outer plate 116. Bolts or studs 112 and 114 may extend through holes 136 in the outer plate 116.

An L-shaped bracket 122 may be mounted onto bolts 112 and 114. In particular, the bolts 112 and 114 may extend through holes 134 formed in the L-shaped bracket 122. Nuts 124 and 126 may secure the L-shaped bracket 122 onto the bolts 112 and 114, respectively. The height of the L-shaped bracket 122 with respect to outer plate 116 may be selectively varied by inserting the bolts 112 and 114 into different ones of the holes 134.

The L-shaped bracket 122 may include a vertical portion 122a and a horizontal portion 122b. The horizontal portion 122b may include a top surface 122c that is configured and adapted for receiving and supporting a terminal end of a spring bar. The horizontal portion 122b may further comprise a hole 132 configured and adapted for receiving an L-shaped pin 128. The L-shaped pin 128 may lock a spring bar onto the L-shaped bracket 122. A pin 130 may be inserted into a hole 144 formed in the L-shaped pin 128 for securing the L-shaped pin 128 in the hole 132.

An outer surface 116a of the outer plate 116 may include a recessed portion 138 for receiving a head 118a of the bolt 118. The recessed portion 138 may include a hole (not visible) for allowing passage of the shaft of the bolt 118 into a hole 146 in the inner plate 110. The recessed portion 138 may be configured and adapted to prevent rotation of the head 118a of the bolt 118 during installation of the nut 102 and the lock washer 104 onto the bolt 118.

The outer plate 116 may include a recessed portion 140 for receiving a head 120a of the bolt 120. The recessed portion 140 may be elongated in the vertical direction such that bolt 120 may selectively engage any one of the holes 142 formed in the inner plate 110. The recessed portion 140 may include holes (not visible) corresponding in number and location to the holes 142 of the inner plate 110. The recessed portion 140 may be configured and adapted to prevent rotation of the head 120a of the bolt 120 during installation of the nut 106 and the lock washer 108 onto the bolt 120.

Figure 7:
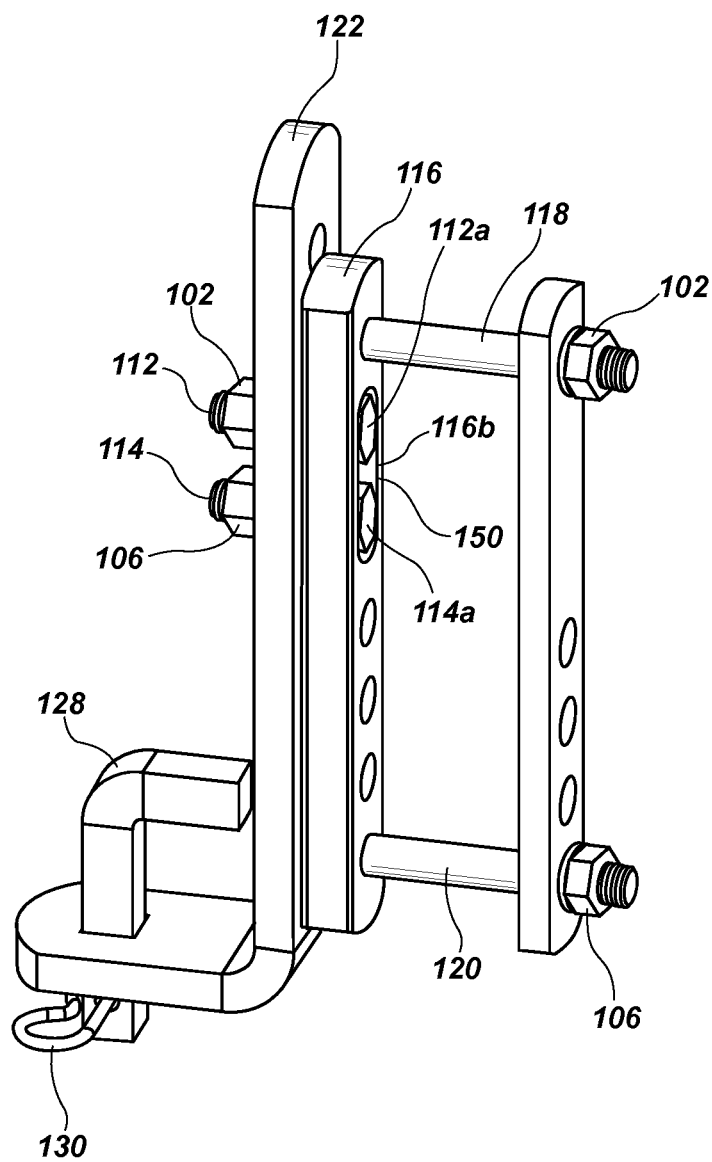
FIG. 7 is a view of a bracket assembly.
Figure 8:
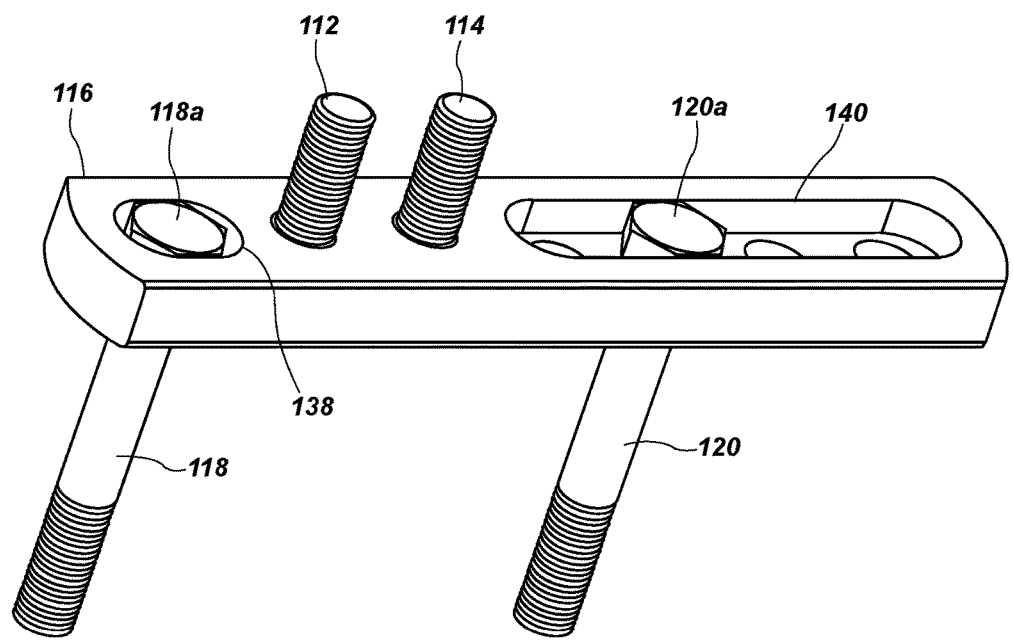
FIG. 8 is a view of a outer plate.

As perhaps best seen in FIG. 7, an inner side 116b of the outer plate 116 may include a recess 150. The recess may be configured and adapted for receiving a head 112a of the bolt 112 and a head 114a of the bolt 114. It will be appreciated that sidewalls of the recess 150 may engage heads 112a and 114a to prevent rotation of the bolts 112 and 114, respectively, as nuts 102 and 106 are installed onto the bolts 112 and 114, respectively. When installed, the frame 17 of the trailer tongue 16 (see FIG. 2) prevents bolts 112 and 114 from exiting the holes 136 (see FIG. 3).

FIGS. 4-8 depict embodiments of the present disclosure, where like reference numerals depict like components.

According to an embodiment of the present disclosure, a system for coupling a trailer tongue to a vehicle, the trailer tongue having a frame member, may comprise:

a hitch;

a spring bar extending from the hitch;

an outer member having a inner side and an outer side;

a recess formed in the inner side of the outer member, said recess having a sidewall;

a hole extending from said inner side to said outer side of said outer member, said hole located in the recess;

a stud installed in said hole and extending outwardly from the outer side of the outer member and terminating at a free end, said stud having a head;

a mounting assembly for securing the outer member to the frame member of the trailer tongue such that the at least one stud extends away from the frame member; and a support member having a surface adapted to support the spring bar;

wherein the support member comprises a plurality of openings for selectively engaging the free end of the at least one stud to thereby provide a variable height adjustment for the support member;

wherein said sidewall of said recess engages said head of the stud to thereby impede rotation of the stud.

It will be understood that the structures disclosed herein may be manufactured using techniques and equipment known to those skilled in the art. For example, the components of the trailer hitch system may be formed using molding, casting, or milling techniques known to those skilled in the art. Those having ordinary skill in the relevant art will appreciate the advantages provided by the features of the present disclosure. For example, it is a feature of the present disclosure to provide a trailer hitch system that is relatively simple in design and manufacture. Another feature of the present disclosure is to provide such a trailer hitch system that reduces trailer sway and equalizes loads. It is a further feature of the present disclosure, in accordance with one aspect thereof, to provide a trailer hitch system having brackets with a plurality of fastening points for improved wear characteristics. It is an additional feature of the present disclosure to provide a trailer hitch system having an aesthetically pleasing appearance.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A bracket assembly for providing a spring bar support on a frame member of a trailer tongue, said bracket assembly comprising:

a first plate and a second plate, the first plate and the second plate defining a space between them for receiving the frame member of the trailer tongue, the second plate having an inner side and an outer side;

a pair of mounting bolts for clamping the first plate and the second plate onto the frame member of the trailer tongue;

at least one stud bolt extending outwardly from the outer side of the second plate;

an L-shaped bracket having a vertical portion and a horizontal portion; and a plurality of mounting holes disposed along the vertical portion of the L-shaped bracket;

wherein the L-shaped bracket is mountable onto the second plate by inserting the at least one stud bolt through one or more of the plurality of mounting holes;

wherein the outer side of the second plate comprises a first recessed portion and a second recessed portion, the first recessed portion having a hole and the second recessed portion having a hole; and wherein said at least one stud bolt is non-rotatable.

2. The bracket assembly of claim 1, wherein the second plate further comprises at least one bore adapted to receive the at least one stud bolt.

3. The bracket assembly of claim 2, wherein the inner side of the second plate comprises a recessed portion, and wherein the at least one bore is disposed in the recessed portion.

4. The bracket assembly of claim 3, wherein each of the at least one stud bolt comprises a shaft having a head, and wherein the at least one stud bolt is adapted to be installed in the at least one bore disposed in the recessed portion of the inner side of the second plate such that the head of the at least one stud bolt engages a sidewall of the recessed portion to prevent rotation of the at least one stud bolt.

5. The bracket assembly of claim 1, wherein the hole in the first recessed portion is adapted to receive one of the pair of mounting bolts and the hole in the second recessed portion is adapted to receive the other one of the pair of mounting bolts.

6. The bracket assembly of claim 5, each of the pair of mounting bolts having a shaft and a head, wherein a sidewall of the first recessed portion and a sidewall of the second recessed portion are adapted to engage the heads of the pair of mounting bolts to thereby prevent them from turning.

7. The bracket assembly of claim 1, wherein the horizontal portion of the L-shaped bracket comprises a hole adapted to receive a pin.

8. A weight distributing hitch assembly comprising:

a hitch head;

at least one spring bar extending from the hitch head and terminating at a free end; and at least one bracket assembly comprising:

a first plate and a second plate, the first plate and the second plate defining a space between them for receiving a frame member of a trailer tongue, the second plate having an inner side and an outer side, a pair of bolts for clamping the first plate and the second plate onto the frame member of the trailer tongue, a pair of stud bolts extending outwardly from the outer side of the second plate, an L-shaped bracket having a vertical portion and a horizontal portion, and a plurality of mounting holes disposed along the vertical portion of the L-shaped bracket;

wherein the L-shaped bracket is mountable onto the second plate by inserting the pair of stud bolts through two of the plurality of mounting holes;

wherein the outer side of the second plate comprises a first recessed portion and a second recessed portion, the first recessed portion having a hole and the second recessed portion having a hole; and wherein the pair of stud bolts are non-rotatable.

9. The hitch assembly of claim 8, wherein the second plate further comprises a pair of bores adapted to receive the stud bolts.

10. The hitch assembly of claim 9, wherein the inner side of the second plate comprises a recessed portion, and wherein the pair of bores are disposed in the recessed portion.

11. The hitch assembly of claim 10, wherein the stud bolts each comprise a shaft having a head, and wherein the stud bolts are adapted to be installed in the pair of bores disposed in the recessed portion of the inner side of the second plate such that the heads of the stud bolts each engage a sidewall of the recessed portion to prevent rotation of the stud bolts.

12. The hitch assembly of claim 8, wherein the hole in the first recessed portion is adapted to receive one of the pair of bolts and the hole in the second recessed portion is adapted to receive the other one of the pair of bolts.

13. The hitch assembly of claim 12, each of the pair of bolts having a shaft and a head, wherein a sidewall of the first recessed portion and a sidewall of the second recessed portion are adapted to engage the heads of the pair of bolts to thereby prevent them from turning.

14. The hitch assembly of claim 8, wherein the horizontal portion of the L-shaped bracket comprises a hole adapted to receive a pin.

15. The hitch assembly of claim 8, wherein the at least one spring bar comprises a pair of spring bars and the at least one bracket assembly comprises a pair of bracket assemblies.

16. The hitch assembly of claim 8, further comprising a ball mounted to the hitch head.

17. The hitch assembly of claim 8, wherein the hitch head comprises an insert portion adapted to be installed into a receiver of a tow vehicle.

18. A weight distributing hitch assembly comprising:
a hitch head, the hitch head having an insert adapted to be installed into a receiver of a tow vehicle;
a ball installed into said hitch head;
a pair of spring bars, each of the pair of spring bars extending from the hitch head and terminating at a free end; and
a pair of bracket assemblies, each bracket assembly comprising:
a first plate and a second plate, the first plate and the second plate defining a space for receiving a frame member of a trailer tongue, the second plate having an inner side and an outer side,
a pair of bolts for clamping the first plate and the second plate onto the frame member of the trailer tongue,
a pair of stud bolts extending outwardly from the outer side of the second plate,
an L-shaped bracket having a vertical portion and a horizontal portion, and
a plurality of mounting holes disposed along the vertical portion of the L-shaped bracket;

wherein the L-shaped bracket is mountable onto the second plate by inserting the pair of stud bolts through two of the plurality of mounting holes;

wherein the second plate further comprises a pair of bores adapted to receive the stud bolts;

wherein the inner side of the second plate comprises a recessed portion, and wherein the pair of bores are disposed in the recessed portion;

wherein the stud bolts each comprise a shaft having a head, and wherein the stud bolts are adapted to be installed in the pair of bores disposed in the recessed portion of the inner side of the second plate such that the heads of the stud bolts each engage a sidewall of the recessed portion to prevent rotation of the stud bolts;

wherein the outer side of the second plate comprises a first recessed portion and a second recessed portion, the first recessed portion having a hole and the second recessed portion having a hole;

wherein the hole in the first recessed portion is adapted to receive one of the pair of bolts and the hole in the second recessed portion is adapted to receive the other one of the pair of bolts;

wherein each of the pair of bolts comprises a shaft having a head, and wherein a sidewall of the first recessed portion and a sidewall of the second recessed portion are adapted to engage the heads of the pair of bolts to thereby prevent them from turning;

wherein the horizontal portion of the L-shaped bracket comprises a hole adapted to receive a pin.

19. A bracket assembly for providing a spring bar support on a frame member of a trailer tongue, said bracket assembly comprising:
a first plate and a second plate, the first plate and the second plate defining a space between them for receiving the frame member of the trailer tongue, the second plate having an inner side and an outer side;
a pair of mounting bolts for clamping the first plate and the second plate onto the frame member of the trailer tongue;
a pair of stud bolts extending outwardly from the outer side of the second plate;
an L-shaped bracket having a vertical portion and a horizontal portion; and
a plurality of mounting holes disposed along the vertical portion of the L-shaped bracket;

wherein the L-shaped bracket is mountable onto the second plate by inserting the pair of stud bolts through two of the plurality of mounting holes;

wherein the second plate further comprises a pair of bores adapted to receive the stud bolts;

wherein the inner side of the second plate comprises a recessed portion, and wherein the pair of bores are disposed in the recessed portion;

wherein the stud bolts each comprise a shaft having a head, and wherein the stud bolts are adapted to be installed in the pair of bores disposed in the recessed portion of the inner side of the second plate such that the heads of the stud bolts each engage a sidewall of the recessed portion to prevent rotation of the stud bolts;

wherein the outer side of the second plate comprises a first recessed portion and a second recessed portion, the first recessed portion having a hole and the second recessed portion having a hole.

20. A weight distributing hitch assembly comprising:
a hitch head;
at least one spring bar extending from the hitch head and terminating at a free end; and at least one bracket assembly comprising:
- a first plate and a second plate, the first plate and the second plate defining a space between them for receiving a frame member of a trailer tongue, the second plate having an inner side and an outer side,
- a pair of bolts for clamping the first plate and the second plate onto the frame member of the trailer tongue,
- a pair of stud bolts extending outwardly from the outer side of the second plate,
- an L-shaped bracket having a vertical portion and a horizontal portion, and
- a plurality of mounting holes disposed along the vertical portion of the L-shaped bracket;
- wherein the L-shaped bracket is mountable onto the second plate by inserting the pair of stud bolts through two of the plurality of mounting holes;
- wherein the second plate further comprises a pair of bores adapted to receive the stud bolts;
- wherein the inner side of the second plate comprises a recessed portion, and wherein the pair of bores are disposed in the recessed portion;
- wherein the stud bolts each comprise a shaft having a head, and wherein the stud bolts are adapted to be installed in the pair of bores disposed in the recessed portion of the inner side of the second plate such that the heads of the stud bolts each engage a sidewall of the recessed portion to prevent rotation of the stud bolts;
- wherein the outer side of the second plate comprises a first recessed portion and a second recessed portion, the first recessed portion having a hole and the second recessed portion having a hole.

21. A bracket assembly for providing a spring bar support on a frame member of a trailer tongue, said bracket assembly comprising:
- a first plate and a second plate, the first plate and the second plate defining a space between them for receiving the frame member of the trailer tongue, the second plate having an inner side and an outer side;
- a pair of mounting bolts for clamping the first plate and the second plate onto the frame member of the trailer tongue;
- at least one stud bolt extending outwardly from the outer side of the second plate;
- an L-shaped bracket having a vertical portion and a horizontal portion; and
- a plurality of mounting holes disposed along the vertical portion of the L-shaped bracket;
- wherein the L-shaped bracket is mountable onto the second plate by inserting the at least one stud bolt through one of the plurality of mounting holes;
- wherein the outer side of the second plate comprises a first recessed portion and a second recessed portion, the first recessed portion having a hole and the second recessed portion having a hole.

22. The bracket assembly of claim 21, wherein the second plate further comprises at least one bore adapted to receive the at least one stud bolt; wherein the inner side of the second plate comprises a recessed portion, and wherein the at least one bore is disposed in the recessed portion; wherein the at least one stud bolt comprises a shaft having a head, and wherein the at least one stud bolt is adapted to be installed in the at least one bore disposed in the recessed portion of the inner side of the second plate such that the head of the at least one stud bolt engages a sidewall of the recessed portion to prevent rotation of the at least one stud bolt.

23. The bracket assembly of claim 21, wherein the hole in the first recessed portion is adapted to receive one of the pair of mounting bolts and the hole in the second recessed portion is adapted to receive the other one of the pair of mounting bolts.

24. The bracket assembly of claim 23, wherein each of the pair of mounting bolts having a shaft and a head, wherein a sidewall of the first recessed portion and a sidewall of the second recessed portion are adapted to engage the heads of the pair of mounting bolts to thereby prevent them from turning.

25. A bracket assembly for providing a spring bar support on a frame member of a trailer tongue, said bracket assembly comprising:
- a first plate and a second plate, the first plate and the second plate defining a space between them for receiving the frame member of the trailer tongue, the second plate having an inner side and an outer side;
- at least one mounting bolt for mounting the first plate and the second plate onto the frame member of the trailer tongue;
- a recess formed in the inner side of the second plate;
- a bore extending from a bottom surface of the recess to the outer side of the second plate;
- a stud member having a shaft extending from a head and terminating at a free end;
- wherein said shaft of said stud member is configured and adapted to be installed in said bore such that the shaft extends outwardly from the outer side of the second plate and terminates at the free end and such that the head of the stud member is disposed in the recess formed in the inner side of the second plate;
- wherein said head of the stud member is retained in said recess by the frame member of the trailer tongue when the first plate and the second plate are mounted onto the frame member of the trailer tongue;
- an L-shaped bracket having a vertical portion and a horizontal portion;
- a plurality of mounting holes disposed along the vertical portion of the L-shaped bracket;
- wherein the L-shaped bracket is mountable onto the second plate by inserting the stud member through one of the plurality of mounting holes,
- wherein the outer side of the second plate comprises a first recessed portion and a second recessed portion, the first recessed portion having a hole and the second recessed portion having a hole.

26. A bracket assembly for providing a spring bar support on a frame member of a trailer tongue, said bracket assembly comprising:
- a first plate and a second plate, the first plate and the second plate defining a space between them for receiving the frame member of the trailer tongue, the second plate having an inner side and an outer side;
- a pair of mounting bolts for clamping the first plate and the second plate onto the frame member of the trailer tongue;
- at least one stud bolt extending outwardly from the outer side of the second plate;
- an L-shaped bracket having a vertical portion and a horizontal portion; and
- a plurality of mounting holes disposed along the vertical portion of the L-shaped bracket;

wherein the L-shaped bracket is mountable onto the second plate by inserting the at least one stud bolt through one of the plurality of mounting holes; and wherein the outer side of the second plate comprises a recessed portion having a hole.

* * * * *